United States Patent [19]

Stickles

[11] Patent Number: 4,494,936

[45] Date of Patent: Jan. 22, 1985

[54] EPISIOTOMY TRAUMA REPAIR TEACHING AID

[76] Inventor: Bonnie J. Stickles, 2109 Sargent Ave., St. Paul, Minn. 55105

[21] Appl. No.: 600,225

[22] Filed: Apr. 17, 1984

Related U.S. Application Data

[63] Continuation of Ser. No. 421,367, Sep. 22, 1982, abandoned.

[51] Int. Cl.³ .............................................. G09B 23/30
[52] U.S. Cl. .................................................... 434/273
[58] Field of Search ............... 434/267, 268, 272, 273, 434/274

[56] References Cited

U.S. PATENT DOCUMENTS

| | | | |
|---|---|---|---|
| 2,324,702 | 7/1943 | Hoffmann | 434/272 |
| 2,495,568 | 1/1950 | Coel | 434/273 |
| 4,195,420 | 4/1980 | Fields | 434/273 |

*Primary Examiner*—Harland S. Skogquist
*Attorney, Agent, or Firm*—John J. Byrne; Bradford E. Kile; Kevin M. O'Brien

[57] ABSTRACT

Disclosed is an episiotomy trauma repair teaching aid having a plurality of modules each of which incorporates one or more three-dimensional simulated perinea into which various types of surgical incisions used in obstetrics for delivery of babies have been formed. Each module has a layer of resilient molded material to simulate flesh and a colored layer of reinforced, self-sealing membrane to simulate sub-cutaneous tissue.

2 Claims, 4 Drawing Figures

4,494,936

EPISIOTOMY TRAUMA REPAIR TEACHING AID

This application is a continuation of application Ser. No. 421,367, filed Sept. 22, 1982 now abandoned.

FIELD OF THE INVENTION

This invention relates to a teaching aid for use in teaching the suturing of episiotomies created in birth trauma.

BACKGROUND OF THE INVENTION

During the birth of babies it sometimes becomes necessary to make an incision in the vaginal area. Such an incision is made when it appears that a jagged tear of the vagina is otherwise inevitable, and the incision, called an episiotomy, is made in order to obtain a clean cut and to direct any tear which may occur in any event away from the sphincter or other more delicate structures.

After the baby has been born, it is necessary to suture, or sew up, the episiotomy and any related lacerations. While the suturing is sometimes done by the physician, it may also be done by a nurse-midwife. It is a relatively complex suturing operation and one which requires a considerable degree of skill. Moreover, there are several distinct types of episiotomies and related lacerations, and each requires a somewhat different suturing operation.

Nurse-midwives are conventionally taught how to suture episiotomies and related lacerations by theoretical discussions, films, rubber band teaching devices, and to a limited degree, practice on cadavers. In addition, an "episiotomy repair model" which can be used as a teaching aid is known from U.S. Pat. No. 4,195,420, issued Apr. 1, 1980, to Sandra Fields. However, the episiotomy repair model disclosed in the Fields patent suffers from two significant defects. First, it illustrates only a single type of episiotomy, so that a substantial number of different models must be used to teach the suturing techniques used for different types of episiotomies. Second, it employs grommet-reinforced holes in the "skin" layers, so that "suturing" is accomplished in a very unrealistic fashion by passing the needle through the grommet holes, rather like threading a shoe lace.

OBJECT OF THE INVENTION

It is, therefore the general object of this invention to provide a teaching aid for teaching suturing of episiotomies and related lacerations which overcomes or ameliorates the drawbacks of the prior art.

It is a particular object of this invention to provide a teaching aid which permits teaching of the proper method of suturing a plurality of different types of episiotomies and related lacerations using only a single teaching aid.

It is another object of this invention to provide a teaching aid for teaching suturing of episiotomies and related lacerations which permits the suturing to be done in a much more realistic fashion than was previously possible.

Other objects and advantages of the invention will become apparent from the description of a preferred embodiment thereof given hereinafter.

SUMMARY OF THE INVENTION

An episiotomy trauma repair teaching air according to the present invention has a plurality of modules each of which incorporates one or more individual, three-dimensional, simulated perinea into which various types of surgical incisions used in obstetrics for delivery of babies have been formed. Each module has a layer of resilient, molded material to simulate flesh and a colored layer of a reinforced, self-sealing membrane to simulate subcutaneous tissue.

DETAILED DESCRIPTION OF THE PRESENTLY PREFERRED EMBODIMENT

Figure 1:
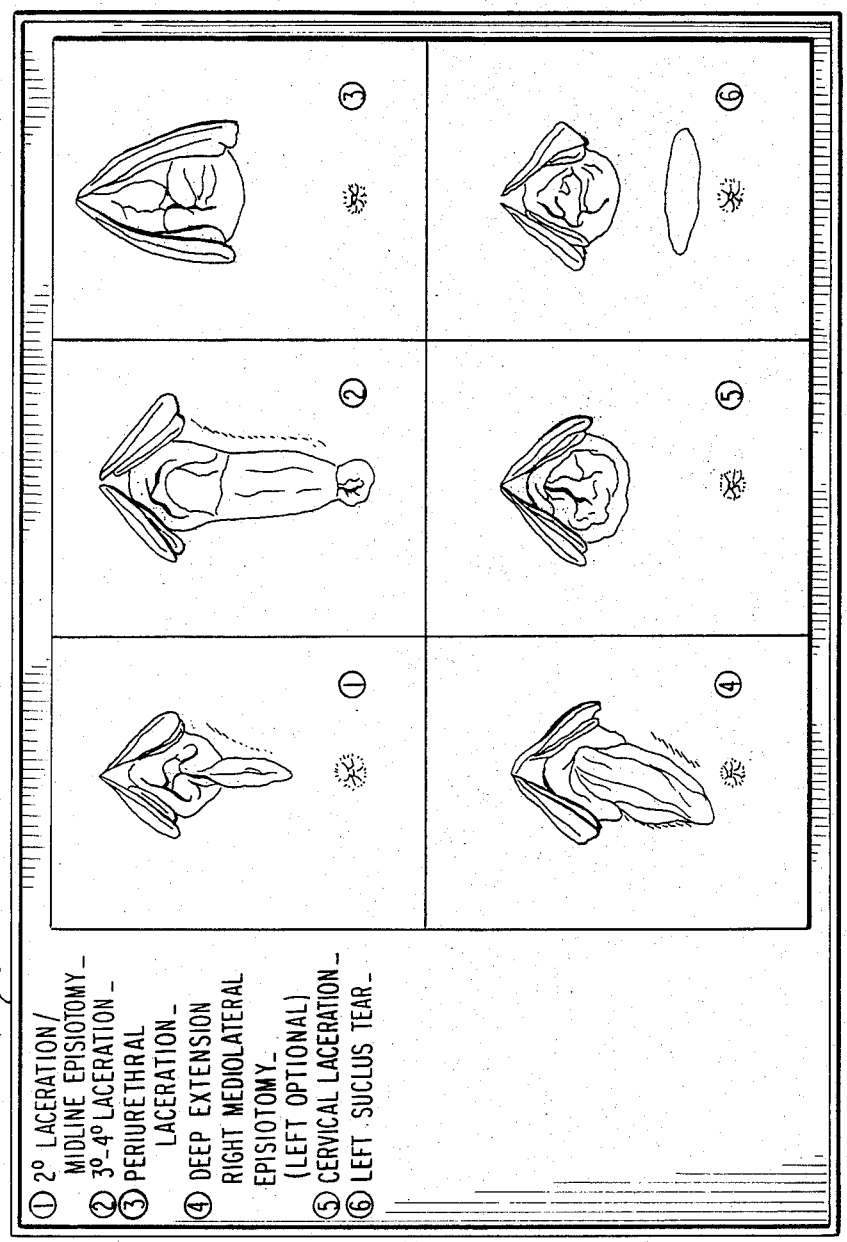
FIG. 1 is a plan view of the presently preferred embodiment of the invention.
Figure 2:
FIG. 2 is a side view of the embodiment shown in FIG. 1.

FIGS. 1 and 2 show the presently preferred version of the episiotomy trauma repair teaching aid in its entirety. In this version, six different types of episiotomies and related lacerations are illustrated, one on each of six modules. The perineal structure and the episiotomies themselves are not described herein, since they, of course, form no part of the present invention. For a detailed description thereof, reference may be had, for instance, to Douglas and Stromme, Operative Obstetrics (3rd edition), Chapter 18, "Management of Delivery Trauma."

Figure 4:
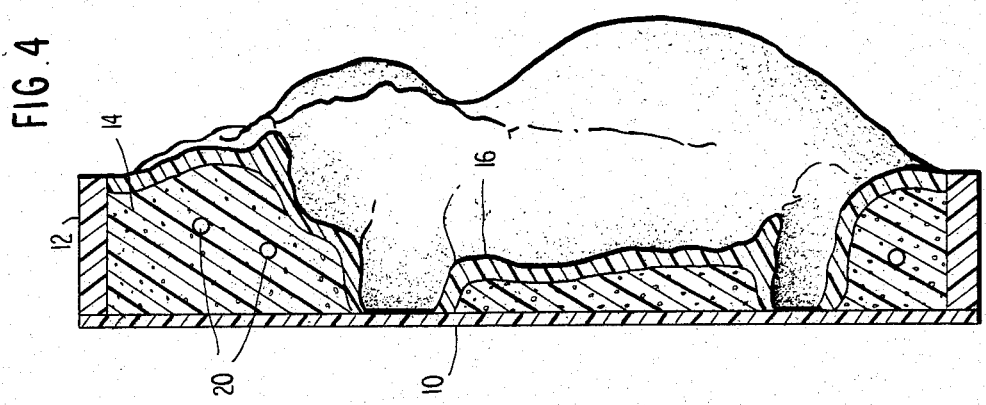
FIG. 4 is a cross-sectional view along the line 4—4 in FIG. 3.
Figure 3:
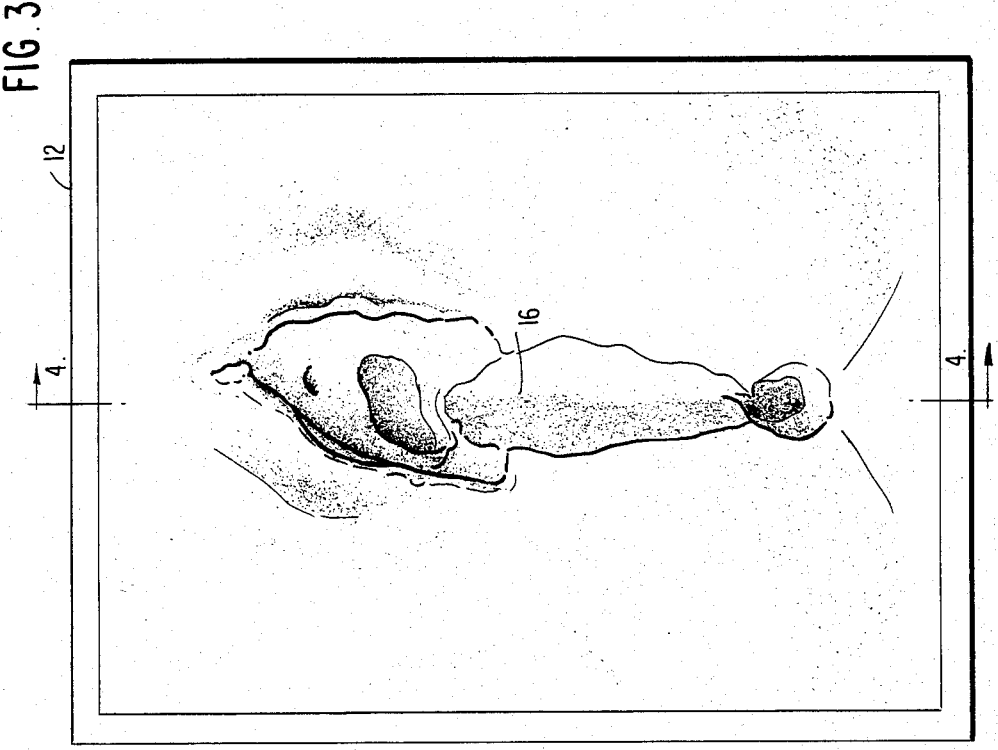
FIG. 3 is a plan view of a single module on an enlarged scale.

As best seen in FIGS. 2 and 4, each of the individual modules is composed of a firm base 10 and sides 12, which provide rigidity to the module, an interior 14 molded from a resilient material to simulate flesh, and a colored layer 16 of reinforced, self-sealing membrane to simulate subcutaneous tissue. A preferably pan-shaped frame 18 is provided to protect the individual modules and to permit a plurality of teaching-aids to be stacked without damaging the individual modules. The frame 18 can be made of pressed wood or fiberboard; the base 10 and sides 12 can be made of latex or PCB; the interior 14 can be made from foam rubber; and the layer 16 can be made from many thin layers of a reinforced, stretched elastic material, such as polymer or cotton thread, covered by several layers of a soft, self-sealing material such as PCB. The interior 14 is preferably cast using a cadaver as the model.

A plurality of colored, resilient, pre-tensioned cords 20 are preferably embedded in the interior 14 to simulate the pelvic musculature and to provide durability.

In use, sutures are passed through the layer 16, into the interior 14, and back through the layer 16. The self-sealing properties of the layer 16 ensure that the modules can be used repeatedly by the same student or by different students.

Caveat

While the present invention has been illustrated by a detailed description of a preferred embodiment thereof, it will be obvious to those skilled in the art that various changes in form and detail can be made therein without departing from the true scope of the invention. For that reason, the invention must be measured by the claims appended hereto and not by the foregoing preferred embodiment.

I claim:

1. An episiotomy trauma repair teaching aid having a plurality of three-dimensional, simulated perinea modules into which various types of surgical incisions used in obstetrics for delivery of babies have been formed, each of said modules comprising:
- a firm PCB base;
- firm PCB sides connected to said base which, with said base, provide rigidity to said module;
- a foam rubber interior portion having an inner surface and an outer surface, said inner surface affixed to said base, and which simulates the response of flesh to suturing;
- a plurality of thin layers of elastic polymeric material connected to said outer surface of said interior layer;
- a plurality of relatively soft colored layers of PCB covering said thin layers of elastic polymeric material, wherein the combination of said layers of elastic polymeric material, said layers of PCB simulates the response of subcutaneous tissue to suturing; and
- a plurality of resilient and pre-tensioned cords embedded in said interior portion to simulate pelvic musclature, wherein said PCB base, said PCB sides, said foam rubber interior portion, said elastic polymeric material, said relatively soft layers of PCB and said plurality of pre-tensioned cords combine to form a durable, flexible, sewable and realistic module in said episiotomy trauma repair teaching aid.

2. An episiotomy trauma repair teaching aid as described in claim 1 wherein said teaching aid comprises six simulated perinea modules.

* * * * *